United States Patent
Baek et al.

(10) Patent No.: US 8,938,746 B2
(45) Date of Patent: Jan. 20, 2015

(54) OBJECT LENS DRIVING DEVICE AND OPTICAL DISC DRIVE INCLUDING THE SAME

(71) Applicant: Toshiba Samsung Storage Technology Korea Corporation, Suwon-si (KR)

(72) Inventors: Soo-hyun Baek, Hwaseong-si (KR); Seung-hak Lee, Seongnam-si (KR); Young-bin Lee, Suwon-si (KR); Seung-man Han, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/964,129

(22) Filed: Aug. 12, 2013

(65) Prior Publication Data
US 2014/0053169 A1   Feb. 20, 2014

(30) Foreign Application Priority Data

Aug. 17, 2012  (KR) ........................ 10-2012-0090093

(51) Int. Cl.
*G11B 7/08*  (2006.01)

(52) U.S. Cl.
USPC ........................................................ 720/662

(58) Field of Classification Search
USPC ........................................................ 720/662
See application file for complete search history.

(56) References Cited

U.S. PATENT DOCUMENTS

| 6,845,510 B2* | 1/2005 | Yoshinaga | 720/681 |
| 7,327,644 B2* | 2/2008 | Ohkuma | 369/44.32 |
| 7,464,389 B2* | 12/2008 | Song et al. | 720/681 |
| 8,117,631 B2* | 2/2012 | Bammert et al. | 720/681 |
| 2005/0210488 A1* | 9/2005 | Kojima | 720/681 |
| 2006/0143639 A1* | 6/2006 | Ke et al. | 720/683 |
| 2007/0169138 A1* | 7/2007 | Nakagaki | 720/683 |
| 2011/0247021 A1* | 10/2011 | Yamada et al. | 720/681 |
| 2013/0339987 A1* | 12/2013 | Yun et al. | 720/681 |

FOREIGN PATENT DOCUMENTS

| JP | 08-115590 | 5/1996 |
| JP | 2002-184133 | 6/2002 |
| JP | 2008-90920 | 4/2008 |
| KR | 10-2005-0027757 | 3/2005 |
| KR | 10-0547359 | 1/2006 |

\* cited by examiner

*Primary Examiner* — Mark Blouin
(74) *Attorney, Agent, or Firm* — NSIP Law

(57) ABSTRACT

Provided is an object lens driving device that includes a wire holder coupled to a support portion and on which an end of a plurality of suspension wires are fixed. The wire holder includes a first area supported on the support portion and a second area extending from the first area and on which the end of each of the plurality of suspension wires is fixed. In this example, a thickness of the second area is thinner than a thickness of the first area.

20 Claims, 6 Drawing Sheets

OBJECT LENS DRIVING DEVICE AND OPTICAL DISC DRIVE INCLUDING THE SAME

CROSS-REFERENCE TO RELATED APPLICATION(S)

This application claims the benefit under 35 USC §119(a) of Korean Patent Application No. 10-2012-0090093, filed on Aug. 17, 2012, in the Korean Intellectual Property Office, the entire disclosure of which is incorporated herein by reference for all purposes.

BACKGROUND

1. Field

The following description relates to an object lens driving device, and more particularly, to an object lens driving device that may improve a vibration characteristic of an object lens.

2. Description of Related Art

Optical disc drives are used to record information to a rotating disc and read information from the disc. An optical disc drive is equipped with a spindle motor for rotating a disc and an optical pickup for recording information on the disc and reading information that is recorded on the disc. The optical pickup may be moved by a transfer motor in a radial direction of a disc.

The optical pickup includes an object lens driving device. The object lens driving device typically has a voice coil type motor structure in which a movable body including an object lens is elastically supported on a fixed body. The movable body is actuated by a magnetic circuit for focusing and tracking. For example, the movable body may be moved in a focus direction or a tracking direction, with respect to the fixed body. Typically the magnetic circuit is embodied by a drive coil provided on the movable body and a permanent magnet provided on the fixed body. In order to ensure stable recording/reproduction quality, stability in a driving characteristic of an object lens is needed.

SUMMARY

In an aspect, there is provided an object lens driving device including a movable body comprising an object lens and a drive coil, a fixed body comprising a support portion and a permanent magnet corresponding to the drive coil, a plurality of suspension wires supporting the movable body with respect to the fixed body, and a wire holder coupled to the support portion and to which ends of the plurality of suspension wires are fixed, the wire holder comprising a first area supported on the support portion and a second area on opposing sides of the first area, the ends of the plurality of suspension wires are fixed to the second area, and a thickness of the second area is less than a thickness of the first area.

The wire holder may comprise a circuit board that has circuit wiring that supplies a current to the drive coil via the plurality of suspension wires.

The first area may be a double-sided circuit board and the second area may be a single-sided circuit board.

The circuit wiring may be provided on a first surface of the wire holder and a dummy circuit may be provided in an area corresponding to the first area on a second surface of the wire holder.

The area where the dummy circuit is provided may be supported on the support portion and the second area on the second surface of the wire holder may be separated from the support portion.

In an aspect, there is provided an optical disc drive including a spindle motor for rotating an optical disc, and an optical pickup unit for recording/reproducing information by sliding in a radial direction of the optical disc to access the optical disc, the optical pickup unit comprising an object lens driving device including a wire holder coupled to a support portion and on which ends of a plurality of suspension wires are fixed, the wire holder comprising a first area supported on the support portion and a second area on opposing sides of the first area, the ends of the plurality of suspension wires are fixed to the second area, and a thickness of the second area is less than a thickness of the first area.

The wire holder may be a circuit board that has circuit wiring that supplies current to a drive coil of the object lens driving device via the plurality of suspension wires.

The first area may be a double-sided circuit board and the second area may be a single-sided circuit board.

The circuit wiring may be provided on a first surface of the wire holder and a dummy circuit may be provided in an area corresponding to the first area on a second surface on the wire holder.

The area where the dummy circuit is provided may be supported on the support portion and the second area on the second surface of the wire holder may be separated from the support portion.

The object lens driving device may further comprise a plurality of object lenses corresponding to a plurality of optical discs having different recording densities.

In an aspect, there is an object lens driving device including a fixed body comprising a support portion, a movable body comprising an object lens and a drive coil, the movable body being supported to the fixed body by a plurality of suspension wires that are electrically connected to the drive coil, and a fixed circuit board supported on the support portion and to which ends of the plurality of suspension wires are fixed, the fixed circuit board comprising a double-sided circuit board area which contacts the support portion and a single-sided circuit board area that is separated from the support portion and to which the ends of the plurality of suspension wires are fixed.

A first surface of the fixed circuit board may comprise circuit wiring for supplying a current to the drive coil via the plurality of suspension wires.

A second surface of the fixed circuit board corresponding to the double-sided circuit board area may make surface contact with the support portion.

A dummy circuit may be provided on the second surface of the fixed circuit board corresponding to the double-sided circuit board area.

In an aspect, there is provided an optical disc drive including a spindle motor for rotating an optical disc, and an optical pickup unit for recording/reproducing information by sliding in a radial direction of the optical disc to access the optical disc, the optical pickup unit comprising an object lens driving device including a fixed circuit board supported on a support portion of the object lens driving device and to which ends of a plurality of suspension wires are fixed, the fixed circuit board comprising a double-sided circuit board area which contacts the support portion and a single-sided circuit board area that is separated from the support portion and to which the ends of the plurality of suspension wires are fixed.

A first surface of the fixed circuit board may comprise circuit wiring for supplying a current to a drive coil via the plurality of suspension wires.

A second surface of the fixed circuit board corresponding to the double-sided circuit board area may make surface contact with the support portion of the object lens driving device.

A dummy circuit may be provided on the second surface of the fixed circuit board corresponding to the double-sided circuit board area.

The object lens driving device may further comprise a plurality of object lenses corresponding to a plurality of optical discs having different recording densities.

Other features and aspects may be apparent from the following detailed description, the drawings, and the claims.

Figure 1:
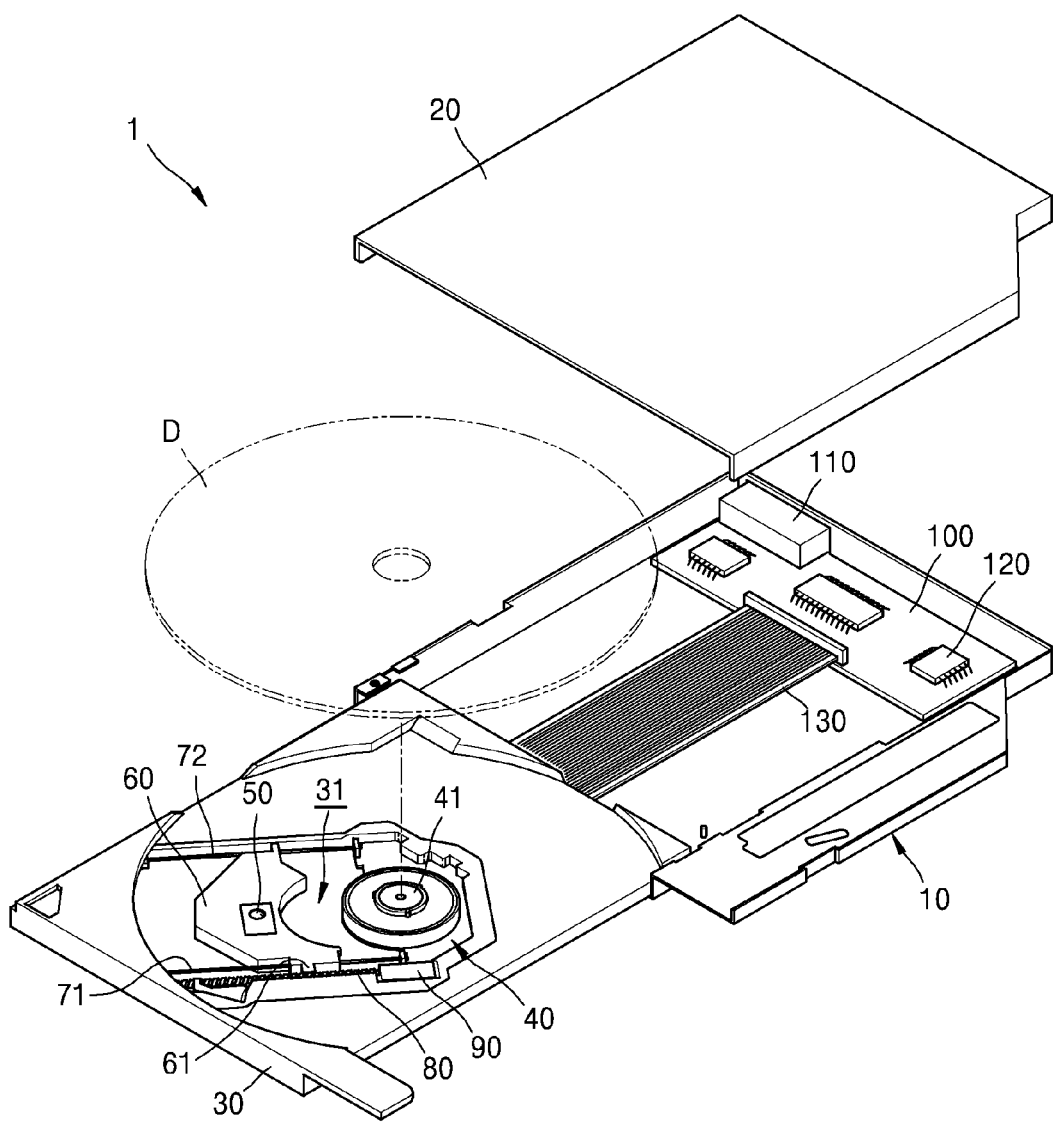
FIG. 1 is a diagram illustrating an example of an optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an optical disc drive 1. Referring to FIG. 1, the optical disc drive 1 includes a spindle motor 40 for rotating a disc D and an optical pickup unit 50 for reading information recorded on the disc D or recording information to the disc D by irradiating light onto the disc D. The optical pickup unit 50 is mounted on a pickup base 60 that moves in a radial direction of the disc D.

A main frame 10 serves as a main chassis. A tray 30 on which the disc D is mounted is slidably provided on the main frame 10. A cover 20 covers an upper portion of the main frame 10, and forms a space between the main frame 10 and the cover 20 through which the tray 30 may pass. Although it is not illustrated in FIG. 1, a locking unit for selectively locking/unlocking the tray 30 with respect to the main frame 10 may be provided on the tray 30.

The tray 30 serves as a frame on which a plurality of parts, such as a spindle motor 40, a pickup base 60, and the like, are mounted. The spindle motor 40 has a rotation shaft on which a turntable 41 for accommodating the disc D is provided and the optical pickup unit 50 is mounted on the pickup base 60. A cavity portion 31 is concavely formed in or vertically penetrates the tray 30 so that the pickup base 60 may slide therein. Guide shafts 71 and 72 for guiding movements of the pickup base 60 are provided on opposing lateral sides of the cavity portion 31. The pickup base 60 is supported on the guide shafts 71 and 72.

A lead screw 80 has a length in a direction in which the pickup base 60 is transferred and the lead screw 80 is arranged at one side of the cavity portion 31. A lead guide 61 is inserted in a screw groove of the lead screw 80 and is provided at one side of the pickup base 60. A transfer motor 90 rotates the lead screw 80. For example, the transfer motor 90 may be a stepping motor. A rotation shaft of the transfer motor 90 may be connected to the lead screw 80. As another example, the rotation shaft of the transfer motor 90 and the lead screw 80 may be integrally formed.

A main control board 100 is provided on the main frame 10. A main connection portion 110 and a drive circuit portion 120 are provided on the main control board 100. For example, the main connection portion 110 may be used for connecting an external power apparatus (not shown) and/or a host apparatus, for example, a computer, of the optical disc drive 1 and the drive circuit portion 120 may be used for driving the optical disc drive 1. The optical pickup unit 50, the spindle motor 40, and the like, may be connected to the main control board 100 via, for example, a main connection cable 130. The main connection cable 130 may be, for example, a flat cable.

Figure 2:
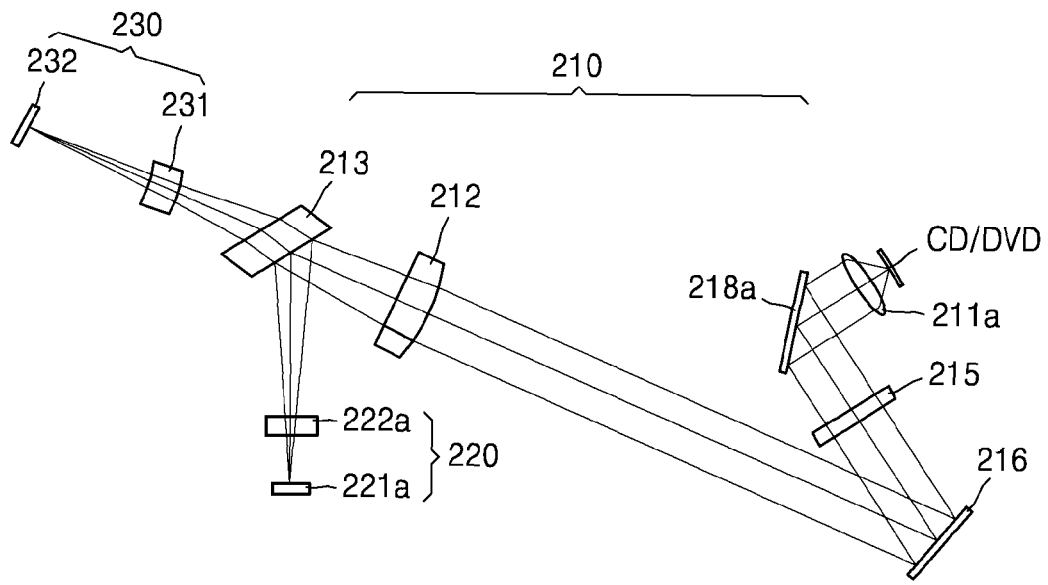
FIG. 2 is a diagram illustrating an example of an optical configuration of an optical pickup unit applied to the optical disc drive of FIG. 1.

FIG. 2 illustrates an example of an optical configuration of the optical pickup unit 50 applied to the optical disc drive 1 of FIG. 1. The optical configuration of the optical pickup unit 50 of FIG. 2 corresponds to a CD/DVD. Referring to FIG. 2, there are a light transmission system 210, a light source system 220 for providing a plurality of beams for recording and/or reproducing information with respect to a CD/DVD. For example, the light source system 220 may provide three beams including a main beam at a center thereof and first and second sub-beams at opposite sides of the main beam, and a light receiving system 230 for generating electrical signals to process data signals or tracking error signals (TES) that are received by a light receiving element 232. In this example, the light receiving element 232 may have three light receiving cells that receive the three beams reflected from the CD/DVD for reproduction of information.

The light source system 220 may include a light source 221a for a CD/DVD and a grating element 222a. A beam emitted from the light source 221a for a CD/DVD is incident on a first beam splitter 213 via the grating element 222a. The grating element 222a may form a main beam and $\pm 1^{st}$ sub-beams from the single incident beam by a grating effect.

The light receiving system 230 may include the light receiving element 232 that detects the three beams reflected from the CD/DVD and passing through the first beam splitter 213 and that generates electrical signals. The light receiving system 230 also includes a sensing lens 231 that focuses the main beam and the first and second sub-beams into sizes suitable for the light receiving element 232.

The light transmission system 210 may include an object lens 211a corresponding to the CD/DVD, optical path changing mirrors 216 and 218a, a quarter wave plate (QWP) 215, a collimating lens 212, and the first beam splitter 213. The first beam splitter 213 may reflect the three beams output from the light source system 220 toward the object lens 211a via the optical path changing mirrors 216 and 218a and simultaneously transmit the light reflected from the CD/DVD via the optical path changing mirrors 216 and 218a to be incident on the light receiving system 230.

Figure 3:
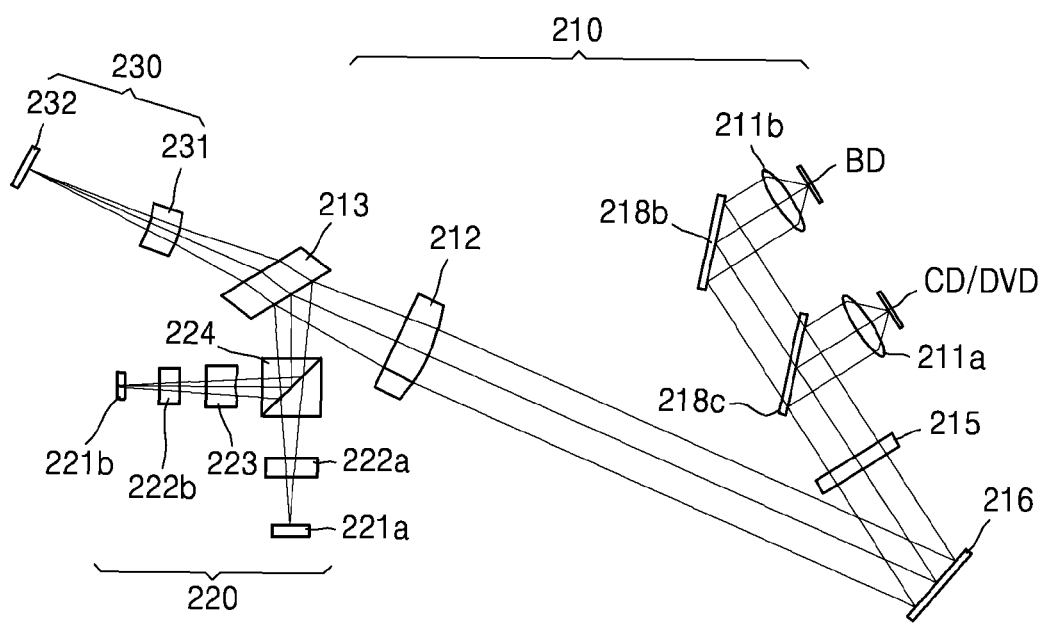
FIG. 3 is a diagram illustrating another example of an optical configuration of an optical pickup unit applied to the optical disc drive of FIG. 1.

FIG. 3 illustrates another example of an optical configuration of the optical pickup unit 50 applied to the optical disc drive 1 of FIG. 1. The optical configuration of the optical pickup unit 50 of FIG. 3 corresponds to a CD/DVD and a Blu-ray disc (BD). Referring to FIG. 3, a total reflection mirror 218b is arranged at an incident side of an object lens 211b corresponding to a BD. A dichroic mirror 218c having a transmittance of a blue light is arranged at an incident side of an object lens 211a corresponding to a CD/DVD. In this example, the total reflection mirror 218b and the dichroic mirror 218c are arranged on an optical path from the optical path changing mirror 216. The optical path changing mirror 216 reflects the light from the first beam splitter 213 toward the total reflection mirror 218b and the dichroic mirror 218c and reflects the light reflected from the CD/DVD and BD via the total reflection mirror 218b and the dichroic mirror 218c toward the first beam splitter 213.

In this example, the light source system 220 includes the light source 221a for a CD/DVD and a light source 221b for a BD, respectively, corresponding to the CD/DVD and the BD and emitting light beams toward two incident surfaces of a second beam splitter 224 having a cubic structure. A coupling lens 223 is provided between the light source 221b for a BD and the second beam splitter 224. The coupling lens 223 may be used for adjusting an optical distance from the light source 221b for a BD to the BD by adjusting an optical magnifying power, that is, a defocus amount of a proceeding light. The light emitted from the two light sources 221a and 221b may proceed toward the first beam splitter 213 via the second beam splitter 224. The grating element 222a for a CD/DVD and a grating element 222b for a BD, which forms the main beam and the $\pm 1^{st}$ sub-beams, are respectively arranged between the second beam splitter 224 and the two light sources 221a and 221b. An interval between the main beam and the $\pm 1^{st}$ sub-beams varies according to an interval between gratings.

Figure 4:
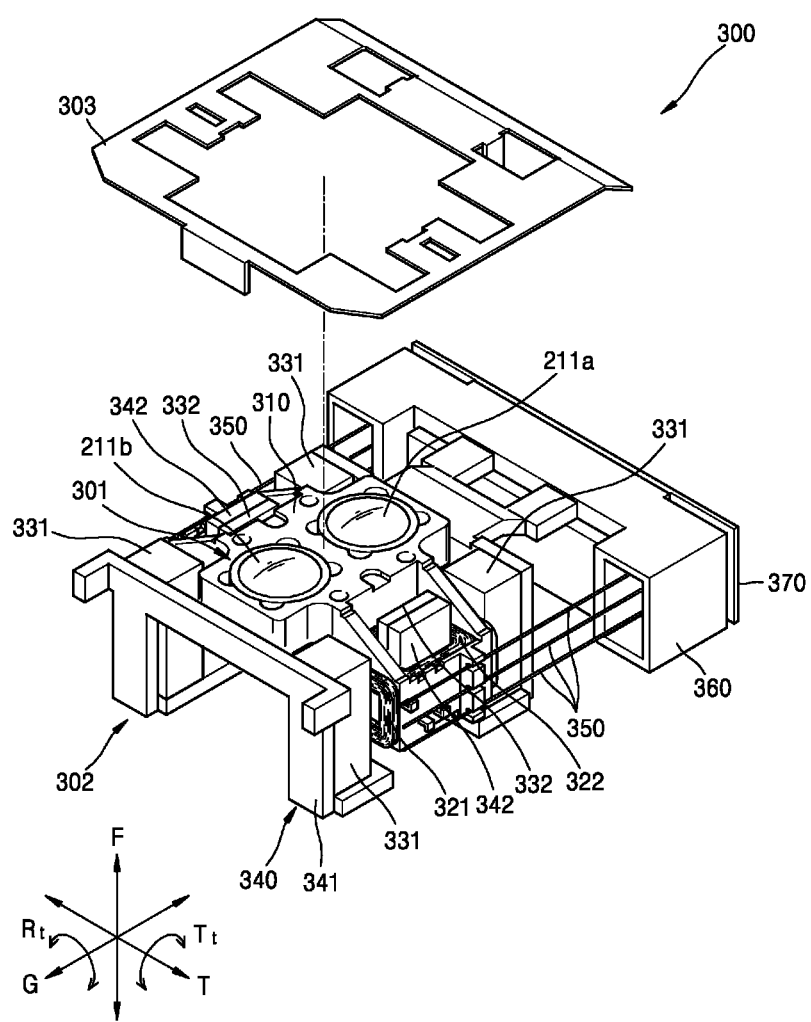
FIG. 4 is a diagram illustrating an example of an object lens driving device.

The above-described optical parts, for example, the optical parts of the light transmission system 210 except for the object lenses 211a and 211b, the light source system 220, and the light receiving system 230, may be arranged on the pickup base 60. The object lenses 211a and 211b may be actuated in a direction, for example, a focusing direction or a tracking direction, to accurately access information track of the disc D. To this end, an object lens driving device is provided. FIG. 4 illustrates an example of an object lens driving device. The object lens driving device 300 of FIG. 4 is an example of the object lens driving device applied to the optical pickup unit 50 having the two object lenses 211a and 211b.

Referring to FIG. 4, the object lenses 211a and 211b are mounted on a blade 310. Drive coils 321 and 322 are provided on the blade 310. For example, drive coil 321 may be for tracking driving to actuate the blade 310 in a tracking direction T, and drive coil 322 may be for focusing driving to actuate the blade 310 in a focusing direction F. Two pairs of drive coils 321 may be arranged, for example, at opposite lateral portions of the blade 310 in a tangential direction G. The drive coils 322 may be arranged, for example, at the opposite lateral portions of the blade 310 in the tracking direction T. In this example, the blade 310 forms a movable body 301 including the object lenses 211a and 211b and the drive coils 321 and 322.

To form a magnetic circuit for tracking driving, permanent magnets 331 may be arranged corresponding to the drive coils 321. For example, four permanent magnets 331 may be arranged by pairs with the four drive coils 321 interposed therebetween. Yoke 341 is arranged outside the permanent magnet 331. The yoke 341 is an outer yoke that supports the permanent magnet 331 and forms a magnetic circuit in a closed circuit, thereby increasing an electromagnetic force to actuate the blade 310.

A permanent magnet 332 may form a magnetic circuit for focusing driving, with the drive coils 322. Yoke 342 is an inner yoke that supports the permanent magnet 332 and concentrates a magnetic vector generated by the permanent magnet 332 on the drive coils 322, thereby improving sensitivity in the focusing driving. In some examples, yokes 341 and 342 may be formed into a single yoke structure 340 by bending a metal plate.

An electromagnetic force may be generated in the same direction, that is, in a −F direction or a +F direction, in the pair of drive coils 322 by adjusting the direction of a current flowing in the drive coils 322 arranged at the opposite lateral sides of the blade 310 in the tracking direction T. Accordingly, the blade 310 may be focusing driven. In addition, by generating electromagnetic forces in opposite directions, that is, in the −F direction and the +F direction, in the pair of drive coils 322, radial tilting driving is possible such that the blade 310 may be actuated in a radial tilt direction Rt.

The blade 310 is supported by a plurality of suspension wires 350. For example, the suspension wires 350 may be arranged at opposing lateral sides of the blade 310 in the tracking direction T to extend in the tangential direction G. One end of each suspension wire 350 may be fixed on a wire holder 370, whereas the other end thereof may be fixed on the blade 310. Although not illustrated, a circuit board for fixing the suspension wires 350 may be provided at opposing lateral sides of the blade 310 in the tracking direction T and the suspension wires 350 may be electrically connected to the drive coils 321 and 322 through the circuit board.

The permanent magnets 331 and 332, the yokes 341 and 342, and a support portion 360 form a fixed body 302. The fixed body 302 may be fixed, for example, on the base 60 of FIG. 1. Accordingly, the movable body 301 is elastically supported by the suspension wires 350 with respect to the fixed body 302.

The structure of the magnetic circuit for driving the movable body 301 is not limited to the example illustrated in FIG. 4. For example, less or more number of drive coils and permanent magnets may be arranged in various forms according to a degree of freedom in driving the movable body 301 in the focusing direction F, the tracking direction T, the radial tilt direction Rt, and the tangential tilt direction Tt. Although FIG. 4 illustrates three pairs of the suspension wires 350, the description herein is not limited thereto and the number of the suspension wires 350 may vary according to the number of drive coils and a degree of freedom in driving. Furthermore, a protection cover 303 may be supported on the yokes 341 and 342.

The wire holder 370 may be fixed on the support portion 360. The support portion 360 may be coupled to, for example, the yoke structure 340.

Figure 5:
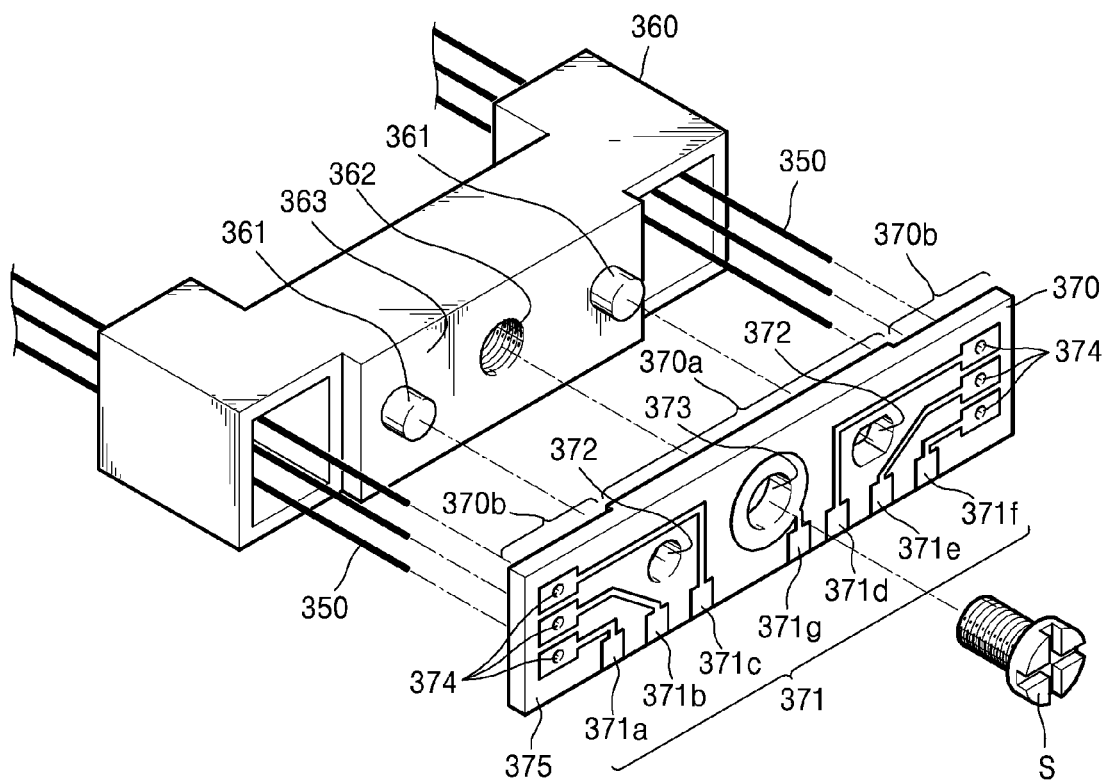
FIG. 5 is a diagram illustrating an example of a coupling relationship between a support portion and a wire holder.
Figure 6:
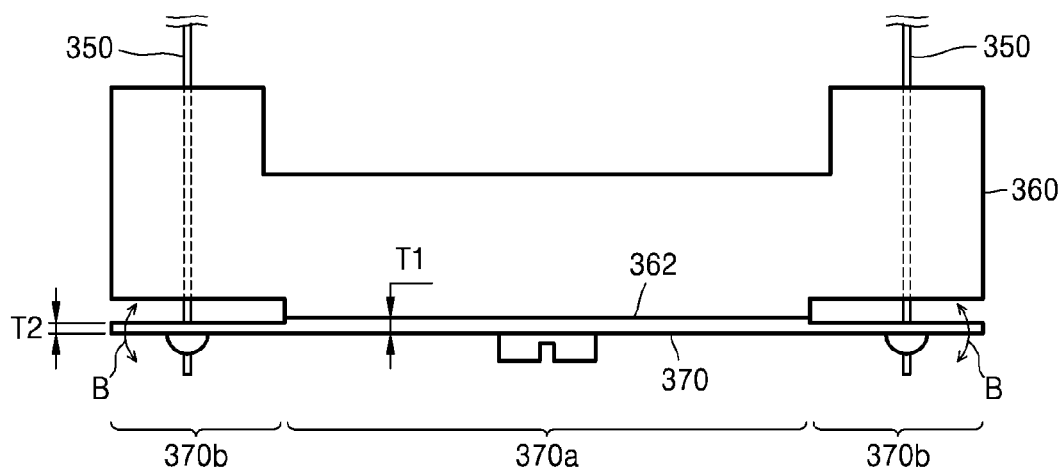
FIG. 6 is a diagram illustrating a coupling relationship between a support portion and a wire holder.

FIG. 5 illustrates an example a coupling relationship between the support portion 360 and the wire holder 370. FIG. 6 illustrates an example of a top portion of the support portion 360 and the wire holder 370. For example, a protruding portion 361 for positional alignment and a coupling portion 362 for coupling a coupling member such as a screw S, are provided in the support portion 360. A position determination hole 372 corresponding to the protruding portion 361 and a coupling hole 373 through which the screw S passes may be provided in the wire holder 370. In this example, the wire holder 370 is arranged to face the support portion 360 so that the protruding portion 361 may be inserted into the position determination hole 372. Then, the screw S may be coupled to the coupling portion 362 and thus the wire holder 370 may be fixed on the support portion 360. The wire holder 370 may adhere to the support portion 360.

For example, the wire holder 370 may be a circuit board provided with a circuit wiring 371 for supplying a current to the drive coils 321 and 322 via the suspension wires 350. A plurality of circuit wirings 371a to 371f corresponding to the suspension wires 350 are provided on the wire holder 370. A fixed portion 374, on which each of the suspension wires 350 is fixedly soldered, may be provided at an end of each of the circuit wirings 371a to 371f. In this example, circuit wiring 371g is a ground wiring. The circuit wirings 371a to 371f may be electrically connected to the main control board 100 via the main connection cable 130. Accordingly, the movable body 301 may be driven in a desired direction by controlling the current supplied from the main control board 100 to the drive coils 321 and 322 via the wire holder 370 and the suspension wires 350.

Figure 7A:
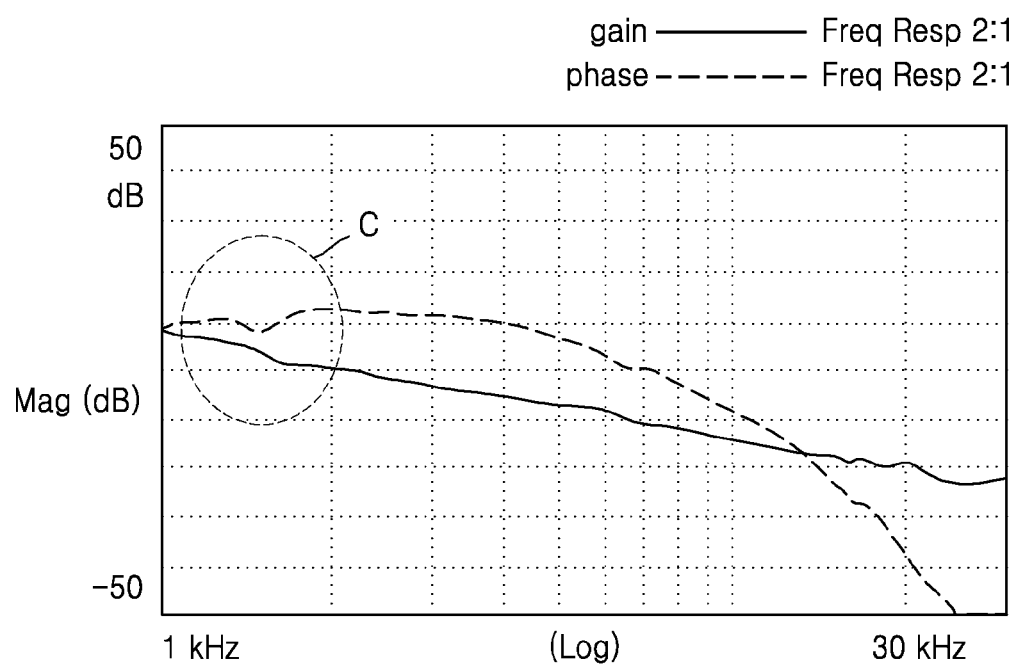
FIGS. 7A and 7B are graphs illustrating an example of a frequency response characteristic of the object lens driving device.
Figure 7B:
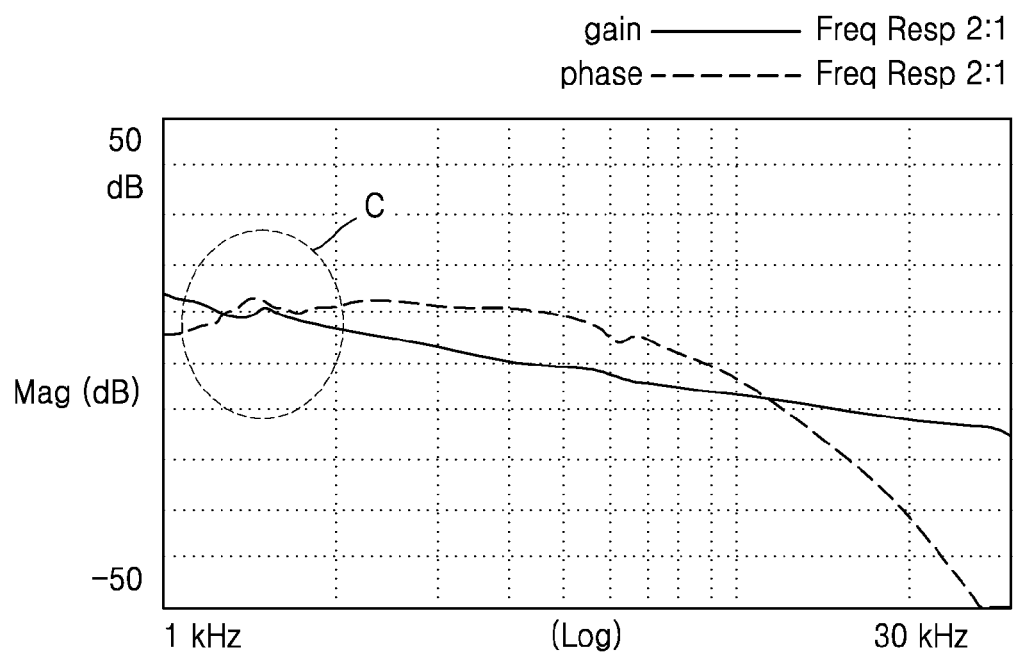

FIGS. 7A and 7B are graphs illustrating examples of a frequency response characteristic of the object lens driving device 300. In this example, the thicknesses of a first area 370a and a second area 370b of the wire holder 370 are uniform and both of the first area 370a and the second area 370b are supported on a support surface 363 of the support portion 360. Referring to FIGS. 7A and 7B, as indicated by a circle C, a first resonance is generated in a frequency range area of several kHz. Here, the resonance may be generated due to discrepancy between a substantial center of gravity of the movable body 301 and the center of driving of the magnetic circuit. The discrepancy between the center of gravity and the center of driving can be caused by a structural factor in a design process, a manufacturing factor due to an error between design values of parts forming the movable body 301 and the fixed body 302 and manufactured states thereof, and the like. In this example, the resonance may reduce driving sensitivity of the object lens driving device 300, and thus recording/reproduction quality may be degraded accordingly.

To reduce or prevent the above described undesired resonance, the wire holder 370 may be considered to function as an attenuator to attenuate resonance. Accordingly, attenuating resonance may be performed by thinning the thickness of the wire holder 370 to be flexibly deformable according to an exciting force that may cause resonance. However, when the thickness of the wire holder 370 is thinned overall, a total strength of the wire holder 370 may be reduced and thus the wire holder 370 may be damaged during coupling of the screw S. Also, as a driving time is accumulated, the wire holder 370 is separated from the support surface 363 of the support portion 360 or is deformed as a whole. Thus, a driving characteristic of the object lens driving device 300 is time-dependently changed, and thus reliability may be deteriorated.

Referring to FIGS. 5 and 6, the wire holder 370 according to various aspects includes the first area 370a supported on the support surface 363 of the support portion 360 and the second area 370b extending from the first area 370a and where the suspension wires 350 are fixed. According to various aspects, the thickness T2 of the second area 370b is smaller than the thickness T1 of the first area 370a. In this example, the first area 370a is fixed on the support surface 363 of the support portion 360 by making a surface contact therewith, whereas the second area 370b is separated from the support surface 363.

According to various aspects, as the second area 370b, that is relatively thin, is flexibly moved corresponding to the exciting force that causes resonance as indicated by an arrow B of FIG. 6, the wire holder 370 may function as an attenuator. Also, because the first area 370a, that is relatively thick, is closely fixed on the support surface 363 of the support portion 360 for maintaining strength, a change in the driving characteristic of the object lens driving device 300 due to damage during manufacturing or time-dependent deformation may be reduced or otherwise prevented.

It is not easy to manufacture the wire holder 370 in the form of a single-sided circuit board having the thickness T2 of the second area 370b that is smaller than the thickness T1 of the first area 370a. That is, because the circuit board is manufactured by forming an insulation layer and a conductive pattern on one surface or both surfaces of a base member, it is not easy to make the thickness of a material of the base member different according to the area.

Figure 8:
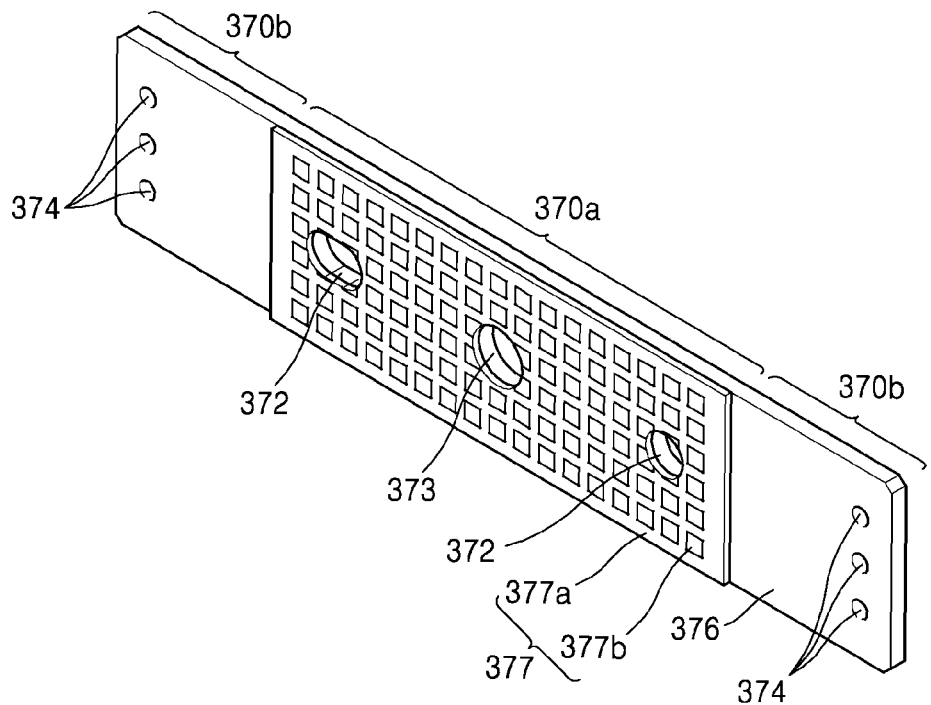
FIG. 8 is a rear diagram illustrating an example of a wire holder.

FIG. 8 illustrates an example of a rear side view of the wire holder 370. Referring to FIGS. 5 and 8, the first area 370a may be a double-sided circuit board area, whereas the second area 370b may be a single-sided circuit board area. The circuit wirings 371a to 371g are formed on a first surface 375 of the wire holder 370. The circuit wirings 371a to 371g may be formed even to areas corresponding to the first area 370a and the second area 370b of the first surface 375. In this example, a dummy circuit 377 is provided on a second surface 376 of the wire holder 370. The dummy circuit 377 is provided in an area corresponding to the first area 370a on the second surface 376. The dummy circuit 377 may be formed in a pattern, for example, a conductive pattern 377b surrounded by an insulation layer 377a. The second area 370b where the dummy circuit 377 is not formed is thinner than the first area 370a where the dummy circuit 377 is formed.

Accordingly, the wire holder 370 in which the thickness T2 of the second area 370b is smaller than the thickness T1 of the first area 370a may be generated. As merely an example, the thickness T2 of the second area 370b, that is the single-sided circuit board area may be about 0.15 mm and the thickness T1 of the first area 370a that is the double-sided circuit board area, may be about 0.05 to 0.1 mm thicker than that of the second area 370b. The first area 370a may be formed to be thicker than the second area 370b by forming only the insulation layer 377a in the area corresponding to the first area 370a on the second surface 376. However, by further forming the conductive pattern 377b, which is metal, the strength of the first area 370a may be reinforced, and thus stability may be improved. It should also be appreciated that the shape of the conductive pattern 377b is not limited to the example of FIG. 8.

According to various aspects, by manufacturing a double-sided circuit board using a base member having a uniform thickness that becomes a base of the circuit board, the wire holder 370 in the form of a circuit board having the second area 370b that is thinner than the first area 370a may be easily manufactured.

Figure 9:
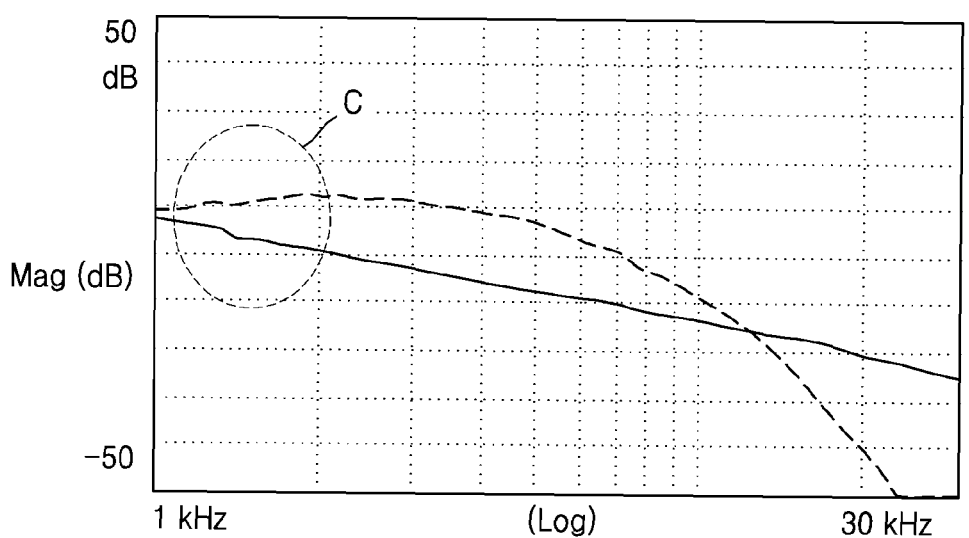
FIG. 9 is a graph illustrating an example of a frequency response characteristic of the object lens driving device of FIG. 4.

FIG. 9 is a graph illustrating an example of a frequency response characteristic of the object lens driving device 300 of FIG. 4, when the thickness T2 of the second area 370b of the wire holder 370 is smaller than the thickness T1 of the first area 370a thereof and the second area 370b is separated from the support surface 363 of the support portion 360. Referring to FIG. 9, as indicated by a circle C, resonance is much weakened in a frequency range area of several kHz.

According to various aspects, the wire holder functions as an attenuator that attenuates resonance of the object lens driving device. As a result, driving stability may be secured. Also, because the wire holder is provided with areas having different thicknesses by a combination of a double-sided circuit board area and a single-sided circuit board area, the overall strength of the wire holder is maintained and a resonance attenuation effect may be obtained. Also, a change in a driving characteristic due to time-dependent deformation of the wire holder may be reduced or prevented.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An object lens driving device comprising:
a movable body comprising an object lens and a drive coil;
a fixed body comprising a support portion and a permanent magnet corresponding to the drive coil;
a plurality of suspension wires supporting the movable body with respect to the fixed body; and
a wire holder comprising a circuit board coupled to the support portion and to which ends of the plurality of suspension wires are fixed, the circuit board comprising a first area supported on the support portion and a second area on opposing sides of the first area, wherein the ends of the plurality of suspension wires are fixed to the second area, and a thickness of the second area is less than a thickness of the first area.

2. The object lens driving device of claim 1, wherein the circuit board comprises circuit wiring configured to supply a current to the drive coil via the plurality of suspension wires.

3. The object lens driving device of claim 1, wherein the first area is a double-sided circuit board area and the second area is a single-sided circuit board area.

4. The object lens driving device of claim 2, wherein the circuit wiring is provided on a first surface of the circuit board and a dummy circuit is provided in an area corresponding to the first area on a second surface of the circuit board.

5. The object lens driving device of claim 4, wherein the area where the dummy circuit is provided is supported on the support portion and the second area on the second surface of the circuit board is separated from the support portion.

6. An optical disc drive comprising:
a spindle motor for rotating an optical disc; and
an optical pickup unit for recording/reproducing information by sliding in a radial direction of the optical disc to access the optical disc, the optical pickup unit comprising an object lens driving device comprising:
a wire holder comprising a circuit board coupled to a support portion and on which ends of a plurality of suspension wires are fixed, the circuit board comprising a first area supported on the support portion and a second area on opposing sides of the first area, wherein the ends of the plurality of suspension wires are fixed to the second area, and a thickness of the second area is less than a thickness of the first area.

7. The optical disc drive of claim 6, wherein the circuit board comprises circuit wiring configured to supply current to a drive coil of the object lens driving device via the plurality of suspension wires.

8. The optical disc drive of claim 6, wherein the first area is a double-sided circuit board area and the second area is a single-sided circuit board area.

9. The optical disc drive of claim 7, wherein the circuit wiring is provided on a first surface of the circuit board and a dummy circuit is provided in an area corresponding to the first area on a second surface on the circuit board.

10. The optical disc drive of claim 9, wherein the area where the dummy circuit is provided is supported on the support portion and the second area on the second surface of the circuit board is separated from the support portion.

11. The optical disc drive of claim 6, wherein the object lens driving device further comprises a plurality of object lenses corresponding to a plurality of optical discs having different recording densities.

12. An object lens driving device comprising:
a fixed body comprising a support portion;
a movable body comprising an object lens and a drive coil, the movable body being supported to the fixed body by a plurality of suspension wires that are electrically connected to the drive coil; and
a fixed circuit board supported on the support portion and to which ends of the plurality of suspension wires are fixed, the fixed circuit board comprising a double-sided circuit board area which contacts the support portion and a single-sided circuit board area that is separated from the support portion and to which the ends of the plurality of suspension wires are fixed.

13. The object lens driving device of claim 12, wherein a first surface of the fixed circuit board comprises circuit wiring for supplying a current to the drive coil via the plurality of suspension wires.

14. The object lens driving device of claim 13, wherein a second surface of the fixed circuit board corresponding to the double-sided circuit board area makes surface contact with the support portion.

15. The object lens driving device of claim 14, wherein a dummy circuit is provided on the second surface of the fixed circuit board corresponding to the double-sided circuit board area.

16. An optical disc drive comprising:
a spindle motor for rotating an optical disc; and
an optical pickup unit for recording/reproducing information by sliding in a radial direction of the optical disc to access the optical disc, the optical pickup unit comprising an object lens driving device comprising:
a fixed circuit board supported on a support portion of the object lens driving device and to which ends of a plurality of suspension wires are fixed, the fixed circuit board comprising a double-sided circuit board area which contacts the support portion and a single-sided circuit board area that is separated from the support portion and to which the ends of the plurality of suspension wires are fixed.

17. The optical disc drive of claim 16, wherein a first surface of the fixed circuit board comprises circuit wiring for supplying a current to a drive coil via the plurality of suspension wires.

18. The optical disc drive of claim 17, wherein a second surface of the fixed circuit board corresponding to the double-sided circuit board area makes surface contact with the support portion of the object lens driving device.

19. The optical disc drive of claim 18, wherein a dummy circuit is provided on the second surface of the fixed circuit board corresponding to the double-sided circuit board area.

20. The optical disk drive of claim 16, wherein the object lens driving device further comprises a plurality of object lenses corresponding to a plurality of optical discs having different recording densities.

* * * * *